Feb. 27, 1962 C. W. BAUGH, JR 3,023,272

AUTOMATIC FREQUENCY CONTROL FOR TELEVISION APPARATUS

Filed July 1, 1958 2 Sheets-Sheet 1

WITNESSES

John C. Healy, Jr.
James F. Young

INVENTOR
Charles W. Baugh, Jr.
BY Benjamin DeWitt
ATTORNEY

Feb. 27, 1962 C. W. BAUGH, JR 3,023,272

AUTOMATIC FREQUENCY CONTROL FOR TELEVISION APPARATUS

Filed July 1, 1958 2 Sheets-Sheet 2

3,023,272
Patented Feb. 27, 1962

3,023,272

AUTOMATIC FREQUENCY CONTROL FOR TELEVISION APPARATUS

Charles W. Baugh, Jr., Montgomery Township, Somerset County, N.J., assignor to Westinghouse Electric Corporation, East Pittsburgh, Pa., a corporation of Pennsylvania Filed July 1, 1958, Ser. No. 745,961
6 Claims. (Cl. 178—5.8)

This invention relates generally to television receivers and more particularly to automatic frequency control systems for television receivers.

The principles of intercarrier sound systems are well known in the art, one description of them may be found in U.S. Patent 2,448,908. For this reason there will be no discussion of these principles in the following specification. The term "intercarrier frequency" as will be used in the specification and claims is intended to designate the beat frequency between picture and sound carriers. According to present standards of the Federal Communications Commission this frequency difference is 4.5 megacycles. Should these standards be changed by specifying a different carrier frequency spacing the term "intercarrier frequency" will designate the new frequency difference between the picture and sound carriers.

It has been the practice in the design of television receivers of the intercarrier sound type to employ some sort of attenuation circuits to control the sound carrier level relative to the picture carrier level. These attenuation circuits, although helping to shape the overall picture intermediate frequency response curve, are essentially provided to prevent beats in the second detector between the sound carrier and high frequency video components in a monochrome video receiver. In single second detector types of color television receivers, an even greater attenuation is usually required at the accompanying sound carrier frequency to prevent beats between the color components and the sound carrier.

It is highly desirable that the frequency of the local oscillator in both monochrome and color television receivers be controlled in order to control the frequency of the intermediate frequency sound signal to effect adequate rejection of the accompanying sound carrier by the attenuation circuits. In the prior art, various systems utilizing conventional frequency discriminators have been proposed for providing frequency control of the sound intermediate frequency. This type of control is not entirely satisfactory since there is a tendency for a conventional frequency discriminator control to drift in frequency relative to the operating frequency of the attenuation circuit.

In a television intercarrier sound receiver, if local oscillator drift takes place, the frequency of the 4.5 megacycle intercarrier sound signal remains unchanged, but the intermediate frequency sound carrier signal may fall on a portion of the intermediate frequency response curve where the attenuation is not satisfactory. Also, if local oscillator drift allows the intermediate frequency video carrier to move from its correct position on the intermediate frequency response curve slope, proper vestigial sideband reception will not be achieved and poor picture quality will result.

In present monochrome and color television receivers, it has generally been found necessary for satisfactory sound and color performance respectively to provide a fine tuning control knob on the front panel of the receiver to make a precise adjustment of the frequency of the local oscillator. In a color television receiver, the fine tuning control knob is usually required to compensate for 920 kilocycle beat between the color subcarrier and the intercarrier sound and to keep the color response at a satisfactory level. If the intermediate frequency sound signal is properly attenuated in the intermediate frequency stage of the receiver, then the color subcarrier, being near to the intermediate frequency sound carrier, will be highly amplitude sensitive by reason of its position near the rapidly falling portion of the frequency passband. Hence, fine tuning is needed to ensure that the color subcarrier lies on the correct point of the frequency response characteristic to achieve the desired transient response.

In copending application Serial No. 628,385, filed December 14, 1956, entitled "Television Apparatus," by Charles W. Baugh, Jr., and assigned to the present assignee, there is disclosed and claimed an automatic frequency control system for an intercarrier type television receiver which makes use of the amplitude level of the 4.5 megacycle intercarrier sound signal to effect control of the frequency of the local oscillator.

In copending application Serial No. 722,735, filed March 20, 1958, entitled "Television Apparatus," by Charles W. Baugh, Jr., and assigned to the present assignee, there is disclosed and claimed an automatic frequency control system which makes use of the amplitude level of the intercarrier sound wave and the amplitude level of the direct current component of the signal at the output of the second detector to effect control of the frequency of the local oscillator. In that system, there is derived a first control signal which is a function of the difference in second detector direct current level due to detection of an input signal which changes from an amplitude modulated signal to a signal that is not amplitude modulated. That first control signal is utilized as a wide band component of the frequency sensing signal in conjunction with a control signal which varies with the amplitude of the intercarrier sound wave to provide a composite frequency control signal having an increased pull-in range for automatic tuning of an intercarrier type television receiver and an increased range of control of the drift of the local oscillator.

While the arrangement and system described and claimed in the last-mentioned copending application is desirable and affords numerous advantages over conventional automatic frequency control systems, it has been found that in some television receiver designs the first control signal, which is a function of difference in second detector direct current level, may not perform effectively. A video wave-form duty cycle of 0.5, and an efficient "keyed" automatic gain control action will produce a difference in direct current level of 1:2 when the dominant input signal at the second detector changes from an amplitude modulated signal to one that is not amplitude modulated. With variations in the video wave form, and the low levels encountered at the second detector, this difference in direct current level is often not sufficient to utilize the wide-band control capabilities of the automatic frequency control system.

It is therefore an object of the present invention to provide a new and improved automatic frequency control system for an intercarrier type television receiver of the general type disclosed in the last-mentioned Baugh application.

It is another object of the present invention to provide such a new and improved system in which the wide-band component of the frequency control signal is substantially enhanced.

It is still another object of the present invention to provide such a new and improved system in which the change in second detector direct current level difference is substantially increased.

It is still another object of the present invention to provide such a new and improved system in which the direct current-alternating current gain of a peak detection or keyed automatic gain control stage is modified to effect an increase in the second detector direct current level difference.

These and other objects of this invention will be apparent from the following description taken in accordance with the accompanying drawing, which drawing forms a part of this application, and in which.

Figure 1:
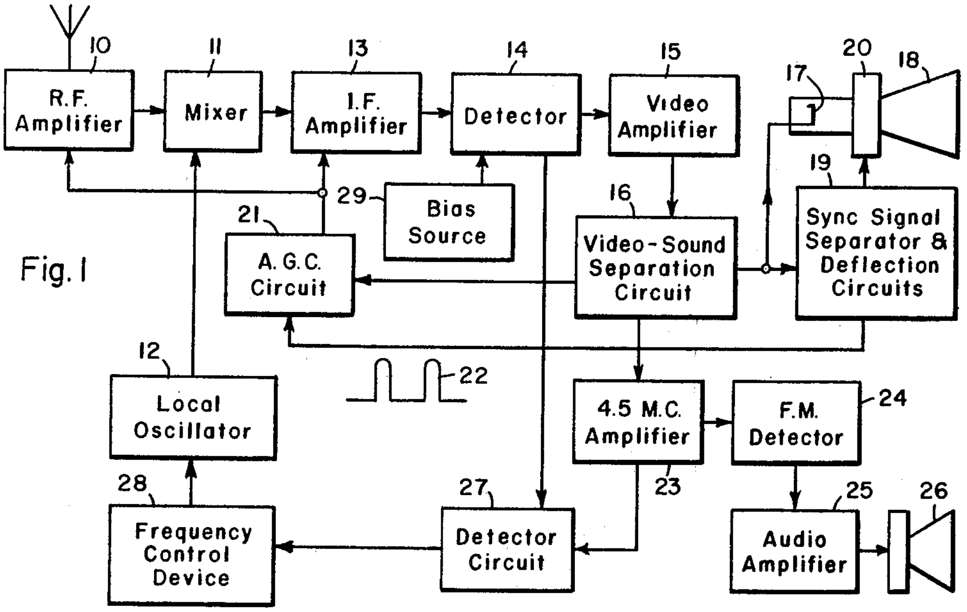
FIGURE 1 is a block diagram embodying the automatic frequency control system of my invention.

The television receiver illustrated in FIG. 1 includes a radio-frequency amplifier 10 which supplies both sound and picture radio-frequency carriers to a mixer 11. In accordance with present day standards, these carriers are separated by 4.5 megacycles.

The output of a local oscillator 12 is coupled to the mixer or first detector 11 and the beat frequencies produced by the heterodyning action within the mixer 11 includes the picture intermediate frequency carrier and the sound intermediate frequency carrier. The picture and sound intermediate frequencies are applied to a common intermediate frequency amplifier 13, wherein signals within a predetermined frequency range defined by the passband of the intermediate frequency amplifier are amplified. The picture and sound intermediate frequencies are applied to a second detector 14 wherein the picture signals are derived from the picture intermediate frequency by amplitude detection and the picture and sound intermediate frequencies are heterodyned to provide an intercarrier sound wave. The video and intercarrier waves are amplified in the video amplifier 15 and are then applied to video-sound separation circuit 16 which separates the video and intercarrier sound signals applying the video signals to the cathode 17 of the image reproducing tube 18 and to the synchronizing and deflection circuits indicated in the drawing by block 19. The synchronizing and deflection circuits 19 include the usual horizontal and vertical synchronizing signal separator circuits and the horizontal and vertical deflection circuits. The deflection circuits generate deflection voltages which are applied to the yoke 20.

The video-sound separation circuit 16 is connected to an automatic gain control circuit 21 so that video signals are applied to the circuit 21. Also, applied to the circuit 21 are a series of pulses 22 derived from an appropriate portion of the horizontal deflection circuit included in the block 19. The automatic gain control circuit 21 includes an automatic gain control tube which conducts during the application of pulses 22 to its anode. The video signals from video-sound separation circuit 16 are connected to the control grid of the automatic gain control tube. The conduction of the gain control tube depends upon the arrival of the pulses 22 at its anode at the same time horizontal synchronizing pulses arrive at its control grid, and the amount of conduction is a function of the potential at its control grid, which depends on the potential at the output of video-sound separation circuit 16. This potential is a function of the strength of the incoming signal. The anode voltage developed by the gain control tube is filtered and the resultant direct current voltage output of the automatic gain control circuit 21 is used to control the amplification of the radio-frequency amplifier 10 and intermediate frequency amplifier 13.

The intercarrier sound signal from the video-sound separation circuit 16 is applied to a 4.5 megacycle amplifier 23 in the sound channel of the receiver wherein it is amplified. The sound channel may comprise a frequency-modulation detector 24 and an audio amplifier 25. The output of the audio amplifier 25 is connected to a sound-reproducing device 26.

The intercarrier sound signal from amplifier 23 is also applied to a 4.5 megacycle detector circuit 27, which may be included if so desired as part of the frequency-modulation detector 24. A suitable circuit for the detector circuit 27 is disclosed in the copending application, Serial No. 722,735, heretofore referred to. The detector circuit 27 functions to produce a direct current signal, the magnitude of which varies as a function of the amplitude of the 4.5 megacycle intercarrier sound signal. The output of the detector circuit 27 is applied to a frequency control element 28 which, in turn, controls the frequency of the local oscillator 12. The frequency control element may comprise a diode which, in series with a condenser, is connected across the tank circuit of the oscillator 12, shunting a variable reactance across the tank and hence controlling the frequency of the local oscillator. This variation of reactance is accomplished by varying the effective load applied to the diode to control its conduction.

In a manner described and claimed in copending application, Serial No. 660,870 filed May 22, 1957, entitled "Television Apparatus" and assigned to present assignee now Patent No. 2,916,545, a signal proportional to the direct current component of the output of detector 14 is applied together with the output of detector circuit 27 to the frequency control element 28 to effect control of the local oscillator 12. A source of direct current biasing voltage 29 is applied to the detector 14 in order to provide the proper operation level for the automatic frequency control system. The signal which is a function of the direct current component of the output of detector 14 varies as the input signal of detector 14 changes from an amplitude modulated video signal to a frequency modulated sound signal as the positions of the intermediate frequency picture and sound waves on the frequency response characteristic of the intermediate frequency amplifier 13 are shifted by reason of a variation in the frequency output of local oscillator 12. This variation or change in the direct current level at the output of the detector 14 is used to increase the range of control over the local oscillator 12. The difference in second detector direct current level between an amplitude modulated carrier input and one that is not substantially amplitude modulated is utilized as a wideband component of the signal.

In accordance with the present invention, the direct current to alternating current ratio of the video signal applied to the automatic gain control circuit 21 from the video-sound separation circuit 16 is modified in order to effect an increase in the difference in direct current level at the detector 14.

Figure 2:
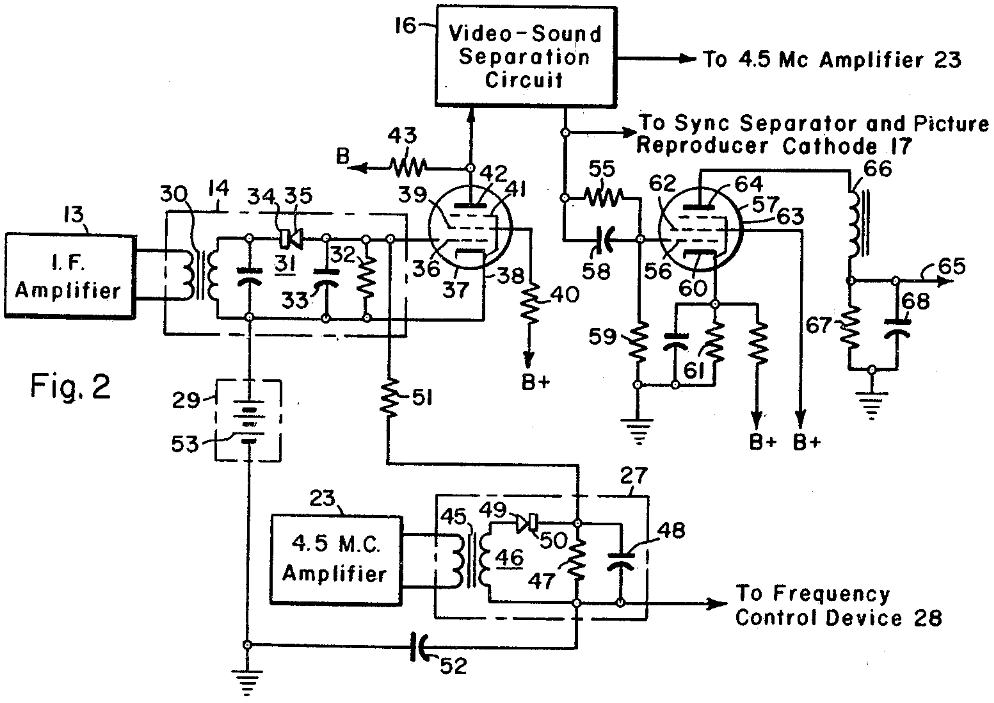
FIG. 2 illustrates a representative form of particular portions of the television receiver of FIG. 1.

In FIG. 2, a typical schematic representation of the components illustrated by some of the blocks of FIG. 1 is shown. It will be appreciated that this schematic diagram is given by way of example only, and that numerous variations, in the circuit details may be effected without departing from the spirit of the present invention.

Referring to FIG. 2 in detail, the intermediate frequency amplifier 13 is coupled by way of transformer 30 to the second detector 14. The second detector 14 includes a germanium diode 31, or any other suitable detecting device, and has a load resistor 32 in parallel with a capacitor 33. The diode 31 has a cathode 34 and an anode 35. The anode 35 is connected to the control grid 36 of an electron discharge device 37. The cathode 34 is connected through the secondary winding of transformer 30 to the cathode 38 of discharge device 37. The cathode 38 is connected to a point of reference potential. Discharge device 37 is connected to constitute the video amplifier stage. The device 37 has a screen electrode 39 connected through a resistor 40 to the positive terminal B+ of a conventional source of direct current potential (not shown), and a supressor electrode 41 which is connected to the cathode 38. Device 37 also has an anode 42 which is connected to the positive terminal B+ through a resistor 43. The anode 42 is connected to the video-sound separation circuit 16 so as to supply the demodulated picture signal and the intercarrier sound signal thereto. The circuit 16 is connected to the 4.5 megacycle amplifier 23 in order to apply the intercarrier sound wave to that amplifier. The circuit 16 is also connected to apply the video signals to the cathode 17 of image reproducing tube 18 and to the synchronizing signal separator included in block 19.

The 4.5 megacycle amplifier 23 is coupled by way of transformer 45 to the detector circuit 27 which is substantially identical to the detector circuit described in copending application Serial No. 660,870, heretofore referred to. The detector circuit 27 includes a germanium diode 46, or any other suitable detecting device, and has a load resistor 47 in parallel with a capacitor 48. The diode has an anode 49 and a cathode 50. The cathode 50 is connected by way of resistor 51 to the anode 35 of the diode 31, and is also connected through the load resistor 47 and a capacitor 52 to a point of reference potential represented as ground. The output of the detector circuit 27 is connected to the frequency control element 28.

The source of direct current biasing voltage is represented as a battery 53. The positive terminal of battery 53 is connected to the detector 14 while its negative terminal is connected to a point of reference potential represented as ground.

The video signals from the video-sound separation circuit 16 are applied by way of a path which comprises a resistor 55 to the control grid 56 of an electron discharge device 57 which operates as an automatic gain control device. The video signals from the video-sound separation circuit 16 are also applied by way of a path which comprises a capacitor 58 to the control grid 56. The control grid 56 is connected to ground through a resistor 59. The automatic gain control device 57 has a cathode 60 connected through a resistor to the positive terminal B+ and is also connected to ground through a resistor 61. The device 57 has a screen electrode 62 connected to the positive terminal B+ and a suppressor electrode 63 which is connected to the cathode 60. Device 57 also has an anode 64 which is connected by way of an automatic gain control bias line 65 to the various controlled stages of the receiver. A winding 66 of the horizontal output transformer is connected directly to the automatic gain control bias line 65 which is connected to ground through a resistor 67 shunted by a capacitor 68.

The automatic gain control circuit including the automatic gain control detector 57 is of the "keyed" type. The video signal from the video-sound separation circuit 16 containing positive-going horizontal synchronizing pulses is applied to the control grid 56 of detector 57. Positive pulses are coupled to the anode 64 from the winding 66 on the horizontal output transformer. Device 57 will conduct when the pulse from winding 66 arrives at the anode 64 at the same time that a horizontal synchronizing pulse arrives at the control grid 56. The anode current of the detector 57 is filtered by the combination of resistor 67 and capacitor 68, and the resultant direct current voltage is applied to the radio-frequency and intermediate frequency stages of the receiver.

The circuit which comprises the resistors 55 and 59 and the capacitor 58 which couples the alternating current signal from device 37 to the automatic gain control detector 57 operates as a voltage divider for the direct current component of the video signal applied to the control grid 56. Division of the direct current video component in this manner, without dividing the alternating current component, effects an increase in the direct current level difference at the second detector 14 between continuous wave and video modulated carrier input. The mode of operation of the foregoing coupling circuit will be manifest from the following.

Figure 3A:
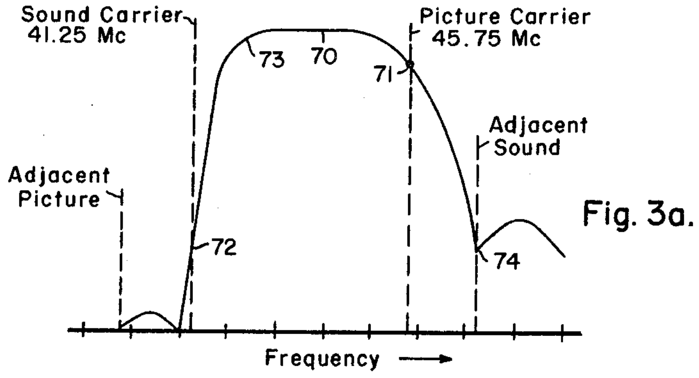
FIGS. 3*a*, 3*b*, 3*c* and 3*d* show a plurality of curves used in explaining the operation of the invention.

As shown in FIG. 3*a*, the intermediate frequency amplifier 13 has a frequency response characteristic indicated by curve 70. On curve 70, point 71 represents the location of the video IF carrier approximately six decibels below the maximum IF response, and point 72 defines the preferred location of the sound IF carrier. When so located, the sound IF carrier is attenuated about 40 decibels below the maximum IF response level.

Thirty to fifty db difference in amplification of the sound IF carrier relative to amplification of the picture IF carrier is desirable to prevent undesirable sound signal signal components from appearing in the demodulated video frequency output of detector 14. Also, the large amplitude difference between the sound IF carrier and the picture IF carrier at detector 14 enables production of a 4.5 megacycle sound intercarrier signal having an unmodulated amplitude independent of amplitude modulation of the picture carrier. The foregoing is in accord with the known principle that the amplitude of a beat frequency from a linear detector is determined by the amplitude of the smaller heterodyning signal and is independent of the amplitude of the larger heterodyning signal (provided that the two signals are substantially different in amplitude).

Figure 3B:
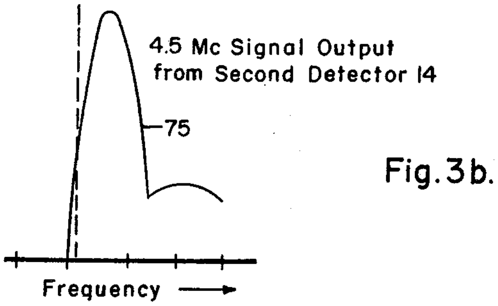
Figure 3C:
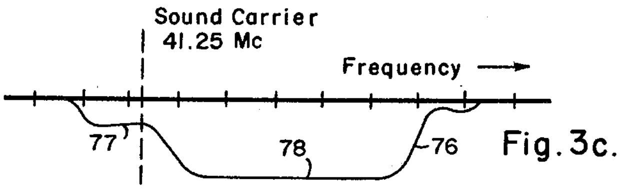
Figure 3D:
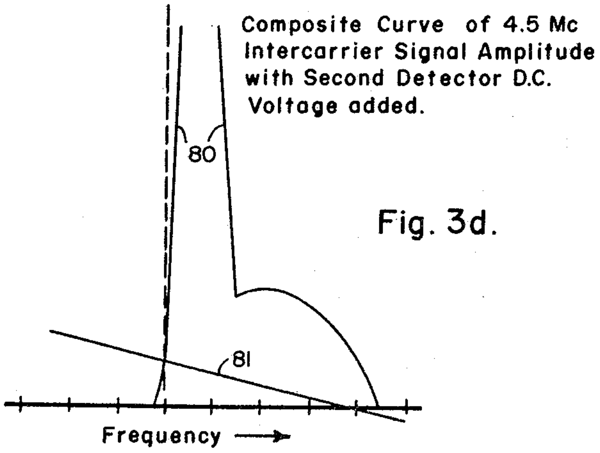

In FIG. 3*b*, curve 75 represents the control signal produced by rectification of the intercarrier sound signal in the detector circuit 27. The amplitude of this control signal varies in accordance with the amplitude of the intercarrier sound signal. In FIG. 3*c*, curve 76 represents the average direct current component at the output of second detector 14. With the intermediate frequency video and sound signals located at the points 71 and 72, respectively, on curve 70 of FIG. 3*a*, the level of this direct current component will correspond to the level at the point 77, for example. The automatic gain control circuit 21 will operate to hold the peak value of the video signal output of second detector 14 substantially constant. With the intermediate frequency sound and video signals located at points 73 and 74, respectively, on curve 70, the level of this direct current component will correspond to the level at point 78, for example. In FIG. 3*d*, curve 80 represents the response of the automatic frequency control system and curve 81 represents a suitable control characteristic for the local oscillator 12.

The operation of the automatic frequency control circuit will now be considered. When an active television channel is selected, the received television signals are respectively converted in the mixer 11 to intermediate frequency signals. The frequency of the local oscillator 12 is initially tuned high, and the intermediate frequency sound carrier of approximately 42.75 megacycles will be located at a position, such as at 73, which is high up on the response characteristic of the intermediate frequency amplifier 13 and the intermediate frequency picture carrier at 47.25 megacycles will be at a position such as at 74. The intermediate frequency picture carrier, because of its position on the response characteristic of the intermediate frequency amplifier 13 is so greatly attenuated that no appreciable beat between the intermediate frequency picture and sound carriers occurs at the second detector 14. At this time no appreciable video signals or intercarrier sound signal will be developed; however, the intermediate frequency sound carrier is located at a position high on the response characteristic. Under this condition the unmodulated intermediate frequency sound carrier will cause a comparatively large direct current voltage to be developed at the second detector 14 as shown at point 78 in FIG. 3*c*. This direct current voltage which is of negative polarity is applied through resistor 51 to the cathode 50 of diode 49. Since the diode 49 is biased in the forward direction, it will conduct to develop a voltage across resistor 47 corresponding to the magnitude of the 4.5 mc. intercarrier signal applied to transformer 45 from amplifier 23. The direct current control voltage developed across capacitor 52 and applied to frequency control device 28 is therefore dependent on the magnitude of the voltage at the output of detector 14. The voltage applied from capacitor 52 to control device 28 lowers the effective load resistance across the frequency control device 28 and thereby lowers the resonant frequency of the local oscillator 12.

With the frequency of the local oscillator 12 lowered, the intermediate frequency sound carrier is caused to move down the response characteristic of the intermediate frequency amplifier 13 and the intermediate frequency picture carrier is caused to move up on this response characteristic. The amplitude of the intermediate frequency sound carrier will decrease and the amplitude of the intermediate frequency picture carrier will increase until the picture carrier becomes the dominant signal at the second detector 14. The picture carrier is detected at detector 14 and the 4.5 megacycle intercarrier sound signal is developed. With the amplitude modulated picture carrier being the stronger signal, the average direct current voltage at the second detector 14 will decrease to the level 77 as shown in FIG. 3*c*.

The change in level of the direct current voltage produced by detector 14 occurs when the frequency of the IF sound carrier shifts from point 73 toward point 72. This voltage change is caused by the action of the peak acting AGC circuit 21 substantially as follows. The IF sound carrier is substantially free of amplitude modulation; hence its average alternating current amplitude is equal to its maximum alternating current amplitude. In contrast, the IF picture carrier, which is amplitude modulated with picture information, has a "blacker-than-black" peak having an amplitude considerably greater than its average carrier amplitude. Specifically, on an all-black picture the average picture carrier amplitude is approximately 75% of its peak amplitude. Similarly, for a typical picture (average brightness) the average picture carrier amplitude is approximately one-half or 50% of the peak amplitude. Thus, the picture carrier has a peak value to average value ratio of 2:1. The IF sound carrier has a peak value to average value ratio of 1:1. When the sound carrier is at point 73 (about 42.75 mc.), it will have a greater amplitude than the picture carrier and accordingly the AGC circuit will respond to the sound carrier to maintain a constant output from detector 14, the level of which is indicated by portion 78 of FIG. 3*c*.

Similarly, when the sound carrier is near point 72 (41.25 mc.), it will be appreciably attenuated, while the picture carrier will be within the IF passband and will be amplified. The picture carrier will have a much greater amplitude than the sound carrier and accordingly, the AGC circuit will respond to the peak values of the picture carrier to maintain those peak values at a level substantially equal to the level indicated by point 78. With the peak amplitude of the picture carrier held at the level of point 78 and with the picture carrier having a peak to average ratio of approximately 2:1, the average direct current voltage applied to detector circuit 27 from detector 14 will be substantially as indicated by portion 77 of FIG. 3*c*.

The intercarrier sound signal developed at second detector 14 is amplified in the video amplifier 15 and the 4.5 mc. amplifier 23 and then coupled to the detector 27 wherein it is rectified. The rectification of the intercarrier sound signal produces a flow of direct current to the frequency control element 28, the magnitude of which is a function of the amplitude of the intercarrier sound signal. The effective resistance across the frequency control element 28 is thereby lowered, further decreasing the frequency of the local oscillator 12. FIG. 3*b* shows the intercarrier signal amplitude as a function of local oscillator frequency. Rectification of the intercarrier signal by diode 49 produces a direct current signal which varies as a function of oscillator frequency.

The frequency of the local oscillator 12 will continue to be decreased until the intermediate frequency picture and sound IF carriers are at or near the normal positions, as indicated at 71 and 72, respectively, in FIG. 3*a*. When the local oscillator 12 is at correct frequency, the control current developed by the automatic frequency control circuit is a composite function of the amplitude of the intercarrier sound signal and the average direct current voltage developed at second detector 14 and applied through resistor 51. This control current is representative of the difference between the natural frequency and the desired frequency of the local oscillator 12. The frequency control element 28 or reactance circuit develops sufficient capacitive reactance to maintain the frequency of the local oscillator 12 within the desired range of permissible "locked-in" frequency deviation, thereby maintaining the picture and sound IF carrier signals at or near predetermined desired frequencies as indicated at points 71 and 72.

If the local oscillator 12 should drift high in frequency, the intercarrier sound signal will increase in amplitude and a greater current is applied to frequency control device 28. This greater current lowers the frequency of the local oscillator 12. If the local oscillator 12 drifts low in frequency, the intercarrier sound signal will decrease in amplitude and a lesser current is applied to the frequency control element 28. This decrease in current increases the frequency of the local oscillator 12.

As stated heretofore, the signal output from the second detector 14 has a peak to average ratio of 2:1 when the picture signal is in the passband. When the sound carrier is in the passband, the peak to average ratio is 1:1. The output signal from the detector 14 is applied by way of separation circuit 16 to the keyed AGC circuit 21 including tube 57 and the voltage divider comprising resistors 55 and 59 and capacitor 58. The resistors 55 and 59 operate to divide the direct current signal voltage applied from separation circuit 16, and capacitor 58 operates to apply alternating current signals directly without division.

When the normal amplitude modulated video signal having a peak to average ratio of 2:1 is applied from separation circuit 16, the synchronizing signal peaks are applied to the grid 56 of tube 57 through capacitor 58, and flyback pulses are simultaneously applied to anode 64 from transformer winding 66. The AGC voltage developed at 65 and applied to the IF amplifier 10 and the IF amplifier 13 will depend upon the synchronizing signal peaks rather than the average direct current output of the detector 14. As a result the output of detector 14 as applied to resistor 51 will be at a level such as 77 in FIG. 3*c*.

When the sound carrier signal is in the passband a comparatively large direct current voltage is developed at the second detector 14 as shown at point 78 in FIG. 3*c*. This direct current voltage is amplified by tube 37 and applied to the voltage divider comprising resistors 55 and 59, and the control voltage applied to grid 56 of the AGC tube will therefore be substantially smaller in relation to the amplitude of the signal applied to detector 14 than is the case when the picture signal is in the passband. Thus, the change in D.C. level at the output of the second detector as controlled by the AGC circuit is substantially increased by the use of the voltage divider comprising resistors 55 and 59 and capacitor 58. The voltage divider operates to change the direct current to alternating current ratio of the video signal as applied to the keyed AGC tube thereby enhancing the change in output from the second detector 14 as the sound carrier moves out of the passband and the picture carrier moves into the passband. That change in D.C. level is indicated in FIG. 3*c* at points 77 and 78. By enhancing the change in D.C. level, the auotmatic frequency control system is caused to have a substantially wider pull-in range.

While the invention has been shown in one embodiment, numerous modifications falling within the spirit and scope of the invention will be readily apparent to those skilled in the art after the benefit of the above teachings has been obtained.

I claim as my invention:

1. In a television receiver for receiving television signals consisting of a video modulated carrier wave of a first frequency and an associated sound modulated carrier wave of a second frequency having a predetermined relation to said first frequency, and in which the output of a local oscillator is heterodyned with said carrier waves so as to develop a separate intermediate frequency carrier signal for each of said carrier waves, an intermediate frequency circuit of sufficient band pass to transmit the two intermediate frequency carrier signals and having a predetermined frequency response characteristic for determining the relative amplitudes of the carrier signals in accordance with the frequencies of said carrier signals relative to said characteristic, amplitude detector and heterodyning means energized from said intermediate frequency circuit to provide an intercarrier sound wave and an amplitude detected signal proportional to the amplitude of said intermediate frequency carrier signals, with the average magnitude of said detected signal being substantially proportional to the amplitude of the video carrier signal when the same is the larger signal transmitted to said detector and being proportional to the amplitude of the sound carrier signal when the sound carrier signal is the larger signal transmitted to said amplitude detector, and with said intercarrier sound wave having an amplitude varying as a function of the amplitude of said intermediate frequency carrier waves, means for producing a first control signal proportional to the average magnitude of said detected signal, means coupled to said amplitude detector and heterodyning means for producing a second control signal varying in accordance with the amplitude of said intercarrier wave, means for controlling the frequency of said local oscillator in response to said first and second control signals, a gain control feedback circuit connected to said amplitude detector and responsive to said detected signal for controlling the gain of said intermediate frequency circuit, said gain control circuit including an automatic gain control detector having input and output terminals with said output terminals being connected to said intermediate frequency circuit to apply gain control bias potential thereto, and further including voltage dividing means connected between said amplitude detector and said input terminals for selectively applying said detected signal to said gain control detector, said dividing means having the property of dividing video frequency components of said detected signal according to a first division ratio and dividing direct current components in accordance with a second division ratio.

2. In a television receiver for operation from a video modulated carrier wave of a first frequency and an associated sound modulated carrier wave of a second frequency having a predetermined relation to said first frequency, and in which means including a local oscillator is utilized for converting said waves to intermediate frequency picture and sound carrier signals, and in which an intermediate frequency amplifier having a predetermined frequency response characteristic is utilized to determine the relative amplitudes of said carrier signals in accordance with the frequency positions of said signals relative to said characteristic, an amplitude detector and heterodyning means coupled to said intermediate frequency amplifier and energized by said carrier signals to provide a detected signal which is a function of the amplitude of the dominant one of said carrier signals and to provide an intercarrier wave having an amplitude related to the amplitude of said sound modulated carrier signal, circuit means coupled to said detector means for deriving a first control signal varying in accordance with the amplitude of said intercarrier wave, circuit means coupled to said detector means for deriving a second control signal having a magnitude which varies as a function of the direct current component of said detected signal, with said second control signal having first and second values respectively depending on which of the carrier signals energizing said amplitude detector and heterodyning means is of greater amplitude value, means for controlling the frequency of said local oscillator in response to said first and second control signals, gain control means including a voltage divider and an automatic gain control detector connected between said amplitude detector and said intermediate frequency amplifier for controlling the gain thereof in accordance with the amplitude of said detected signal, said voltage divider comprising a first path including alternating-current coupling means for applying at least a portion of said detected signal to said automatic gain control detector, and a second path including direct current coupling means for applying a portion of the direct current component of said detected signal to said automatic gain control detector, said second path being adapted to attenuate said direct current component to a substantially greater degree than the extent to which said first path attenuates the alternating current components of said detected signal so that said gain control means increases the gain of said intermediate frequency amplifier and thereby increases said direct current component of the detected signal and said second control signal when the amplitude of said sound carrier signal becomes greater than the amplitude of said picture carrier signal at said detector.

3. In a television receiver for operation from a video modulated carrier wave of a first frequency and an associated sound modulated carrier wave of a second frequency having a predetermined relation to said first frequency, and in which means including a local oscillator is utilized for converting said waves to intermediate frequency picture and sound carrier signals, and in which an intermediate frequency amplifier having a predetermined frequency response characteristic is utilized to determine the relative amplitudes of said carrier signals in accordance with the frequency positions of said signals relative to said characteristic, an amplitude detector and heterodyning means coupled to said amplifier and energized by said carrier signals to provide a detected signal proportional to the amplitude of the one of said carrier signals which has the larger amplitude and to provide an intercarrier sound wave having an amplitude related to the amplitude of said sound carrier signal, means coupled to said detector for producing a first control signal proportional to the amplitude of said intercarrier wave, means connected to said detector for producing a second control signal having a magnitude proportional to the direct current component of said detected signal, with said second control signal having first and second values respectively corresponding to location of said sound carrier signal at first and second positions on said response characteristic, means connected to said local oscillator for controlling the frequency thereof in response to said first and second control signals, gain control means including a voltage divider circuit and an automatic gain control detector connected between said amplitude detector and said intermediate frequency amplifier for controlling the gain thereof in response to said detected signal, said voltage divider circuit comprising a first path including alternating current coupling means for applying at least a portion of said detected signal to said automatic gain control detector, and a second path including direct current coupling means for applying at least a portion of the direct current component of said detected signal to said automatic gain control detector, said second path being adapted to attenuate said direct current component to a substantially greater degree than the extent to which said first path attenuates alternating current components of said detected signal.

4. In a television receiver, the combination of converter means for producing separate intermediate frequency picture and sound carriers, a detector for heterodyning and amplitude detecting said intermediate frequency carriers to produce an intercarrier sound wave and a composite detected signal including a video signal, and a direct current component, frequency selective amplifier means coupled between said converter means and said detector, said amplifier means having a frequency response characteristic such that the amplitude of said intermediate frequency sound carrier as applied to said detector will normally be less than the amplitude of the picture carrier and such that the amplitude of said sound carrier increases in response to increase in the frequency thereof and at times exceeds the amplitude of said picture carrier whereby said direct current component of the detected signal normally has a first amplitude level corresponding to the average amplitude of the picture carrier and at times has a second amplitude level dependent upon the amplitude of said sound carrier, a gain control circuit coupled to said detector and responsive to said composite signal to produce a gain control potential which varies as a function of the amplitude of the larger carrier applied to said detector, means connected between said gain control circuit and said frequency selective amplifier means for applying said gain control potential to said amplifier means to thereby maintain the magnitude of said direct current component of the composite signal substantially at a first level during times when the picture carrier amplitude at the detector exceeds the sound carrier amplitude and at said second level when the sound carrier has the greater amplitude, said gain control circuit including an automatic gain control detector and a voltage divider connected between said amplitude detector and said gain control detector, said divider having the property of dividing alternating current voltages according to a first output-input ratio and dividing direct current voltages in accordance with a second output-input ratio, means connected to said amplitude detector for deriving a first direct current control signal which varies as a function of the average amplitude of said composite detected signal, means coupled to said amplitude detector for producing a second direct current control signal varying in accordance with the amplitude of said intercarrier sound wave, and means connected to said converter means for utilizing said first and second control signals to control the frequencies of said intermediate frequency carriers.

5. In a television receiver for receiving a television signal band including an amplitude modulated picture carrier wave and a frequency modulated sound carrier wave spaced a substantially fixed frequency interval from the picture carrier wave, the combination of converter means responsive to said carrier waves for producing separate intermediate frequency picture and sound carriers, frequency selective amplifier means coupled to said converter for selectively amplifying said intermediate frequency picture and sound carriers, said amplifier means having a frequency response characteristic such that the amplitude of the amplified sound carrier will normally be less than the amplitude of the amplified picture carrier and such that the amplitude of said sound carrier increases in response to an increase in the frequency thereof and at times exceeds the amplitude of said picture carrier, a detector coupled to said amplifier means and operative in response to said intermediate frequency carriers to produce an intercarrier signal and a composite detected signal including video signals having a direct current voltage component, a video frequency signal transmission channel connected to said detector for applying said composite detected signal to an image reproducer, a keyed automatic gain control circuit connected between the output of said channel and said frequency selective amplifier and synchronously responsive to the magnitude of recurrent peaks of said video signals to control the receiver gain so as to stabilize the magnitude of said direct current voltage component at the output of said detector at a first level during the times when the picture carrier amplitude exceeds the sound carrier amplitude and at a second level during times when the sound carrier exceeds the picture carrier amplitude, said video signal transmission channel including a voltage divider characterized in that is presents a first division ratio to alternating current signals and a second division ratio to direct current signals with said first ratio being substantially greater than said second ratio, circuit means coupled to the output of said video frequency signal channel for deriving a first direct current control signal having a magntiude which varies as a function of said intercarrier signal, circuit means coupled to the output of said detector for deriving a second direct current control signal having a magnitude which varies as a function of said direct current voltage component of the detected signal, and control means coupled to both said circuit means and to said converter means to control the frequency of said intermediate frequency picture and sound carriers in response to said first and second direct current potentials.

6. In a television receiver for receiving a television signal band including an amplitude modulated picture carrier wave and a frequency modulated sound carrier wave spaced a substantially fixed frequency interval from the picture carrier wave, the combination of converter means responsive to said carrier waves for producing separate intermediate frequency picture and sound carriers, a detector for heterodyning said intermediate frequency carriers to produce an intercarrier signal of a frequency corresponding to said frequency interval and for amplitude detecting said carriers to produce a composite detected signal including a video signal and a direct current component, frequency selective amplifier means coupled between said converter means and said detector, said amplifier means having a frequency response characteristic such that the amplitude of said sound carrier as applied to said detector will normally be less than the amplitude of the amplified picture carrier and such that the amplitude of the amplified sound carrier increases in response to increase in the frequency thereof and at times exceeds the amplitude of the amplified picture carrier whereby said direct current component of the detected signal normally has a first amplitude level corresponding to the average amplitude of the picture carrier and at times has a second amplitude level dependent upon the amplitude of said sound carrier, a video frequency signal transmission channel having an input connected to said detector and an output connected to apply said composite detected signal to an image reproducer, a gain control circuit coupled to said output and responsive to recurrent peak portions of signals at said output to produce a gain control potential which varies as a function of the recurrent peak amplitudes of the larger carrier applied to said detector, circuit means connected between said gain control circuit and said frequency selective amplifier means for applying said gain control potential to control the gain of said amplifier means to maintain the magnitude of said direct current component of the composite signal at a first level during times when the picture carrier amplitude exceeds the sound carrier amplitude and at a second level when the sound carrier has the greater amplitude at the detector, said video frequency signal channel including a voltage divider having the property of dividing alternating current voltages according to a first output-input ratio and dividing direct current voltages in accordance with a second output-input ratio, circuit means including a rectifier device coupled to the output of said signal channel for deriving a first direct current control signal having a magnitude which varies as a function of said intercarrier signal amplitude, circuit means coupled to the output of said detector for deriving a second direct current control signal having first and second magnitudes related respectively to said first and second levels of said direct current component of the composite detected signal, and direct current responsive frequency control means connected to both said circuit means and to said converter means for controlling the frequency of said intermediate frequency carriers in response to the sum of said first and second direct current control signals.

References Cited in the file of this patent

UNITED STATES PATENTS

| | | |
|---|---|---|
| 2,632,047 | Schlesinger | Mar. 17, 1953 |
| 2,664,464 | Cotsworth | Dec. 29, 1953 |
| 2,844,649 | Kroger | July 22, 1958 |
| 2,845,483 | Massman | July 29, 1958 |
| 2,882,334 | Adler | Apr. 14, 1959 |

FOREIGN PATENTS

| | | |
|---|---|---|
| 601,227 | Great Britain | Apr. 30, 1948 |